United States Patent
Kansal et al.

(10) Patent No.: US 12,348,344 B1
(45) Date of Patent: Jul. 1, 2025

(54) CONFIGURABLE TRANSMITTER ARCHITECTURE FOR SUPPORTING MULTIPLE DATA RATES

(71) Applicant: Synopsys, Inc., Sunnyvale, CA (US)

(72) Inventors: Shourya Kansal, Immadihalli (IN); Aditya Aurangabadkar, Pune (IN)

(73) Assignee: Synopsys, Inc., Sunnyvale, CA (US)

( * ) Notice: Subject to any disclaimer, the term of this patent is extended or adjusted under 35 U.S.C. 154(b) by 48 days.

(21) Appl. No.: 18/537,533

(22) Filed: Dec. 12, 2023

(51) Int. Cl.
*H04L 27/04* (2006.01)
*H04L 7/033* (2006.01)

(52) U.S. Cl.
CPC .............. *H04L 27/04* (2013.01); *H04L 7/033* (2013.01)

(58) Field of Classification Search
CPC .............................. H04L 27/04; H04L 7/033
See application file for complete search history.

(56) References Cited

U.S. PATENT DOCUMENTS

| | | | |
|---|---|---|---|
| 2006/0245527 A1* | 11/2006 | Crutchfield | H04L 7/0331 375/354 |
| 2011/0196997 A1* | 8/2011 | Ruberg | H04L 69/32 327/156 |
| 2016/0019182 A1* | 1/2016 | Clements | G06F 1/08 710/105 |

* cited by examiner

*Primary Examiner* — Vineeta S Panwalkar
(74) *Attorney, Agent, or Firm* — Patterson + Sheridan, LLP

(57) ABSTRACT

Systems and methods for supporting multiple data rates are presented. A method includes generating a clock signal from a clock source, serializing, by an analog serializer, a data stream in response to the clock signal to output N data in parallel, coupling a pulse generation circuit to the clock signal, wherein a first switch and a second switch electrically communicate with the pulse generation circuit, and coupling a multiplexer to the pulse generation circuit, wherein the multiplexer receives the N data from the analog serializer and selects a subset of the N data when switching operation of the electronic circuit from a first mode to a second mode.

20 Claims, 10 Drawing Sheets

When clk=0 and clk 180=1

| 1ui N Pulse 510 | Logic 520 | 1ui P Pulse 530 | Logic 540 |
|---|---|---|---|
| n_sel0 512 | 0 522 | p_sel0 532 | 1 542 |
| n_sel90 514 | clk4_90 524 | p_sel90 534 | clk4_270 544 |
| n_sel180 516 | clk4_270 526 | p_sel180 536 | clk4_90 546 |
| n_sel270 518 | 0 528 | p_sel270 538 | 1 548 |

CONFIGURABLE TRANSMITTER ARCHITECTURE FOR SUPPORTING MULTIPLE DATA RATES

TECHNICAL FIELD

The present disclosure generally relates to an integrated circuit (IC). More specifically, the present disclosure relates to a transmitter for supporting multiple data rates.

BACKGROUND

In view of advancements in Artificial Intelligence (AI), telecommunication infrastructure and data centers should be upgraded to support an exponential increase in network traffic. One component in wired communication infrastructure is a serializer/deserializer (SerDes). SerDes is used for transmitting data from one place to another place through one or more channels. The data rate for wired communications doubles almost every few years. As such, the architecture of SerDes should match the increased demand for higher data rates.

SUMMARY

The present disclosure describes circuits (e.g., a transmitter circuit) and methods for supporting multiple data rates in a transmitter circuit incorporated in a serializer/deserializer (SerDes).

In one example, an electronic circuit includes a clock source configured to generate a clock signal, an analog serializer that serializes a data stream in response to the clock signal to output N data in parallel, a pulse generation circuit coupled to the clock signal, wherein a first switch and a second switch electrically communicate with the pulse generation circuit, and a multiplexer coupled to the pulse generation circuit, wherein the multiplexer receives the N data from the analog serializer and selects a subset of the N data when switching operation of the electronic circuit from a first mode to a second mode.

In another example, a method for enabling a transmitter to support multiple data rates includes generating a clock signal from a clock source, serializing, by an analog serializer, a data stream in response to the clock signal to output N data in parallel, coupling a pulse generation circuit to the clock signal, wherein a first switch and a second switch electrically communicate with the pulse generation circuit, and coupling a multiplexer to the pulse generation circuit, wherein the multiplexer receives the N data from the analog serializer and selects a subset of the N data when switching operation of the electronic circuit from a first mode to a second mode.

In yet another example, a non-transitory computer readable medium having stored instructions, which when executed by a processor, cause the processor to serialize a data stream in response to a clock signal to output N data in parallel, couple a pulse generation circuit to the clock signal, wherein a first switch and a second switch electrically communicate with the pulse generation circuit, feed the N data in parallel to a 4:1 multiplexer that includes four inputs each having a 2:1 multiplexer input, and select, by the 2:1 multiplexer input, a subset of the N data when switching operation of an electronic circuit from a quarter-rate mode to a half-rate mode.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 illustrates an example logic table when the transmitter operates in a half-rate mode.

DETAILED DESCRIPTION

Figure 1:
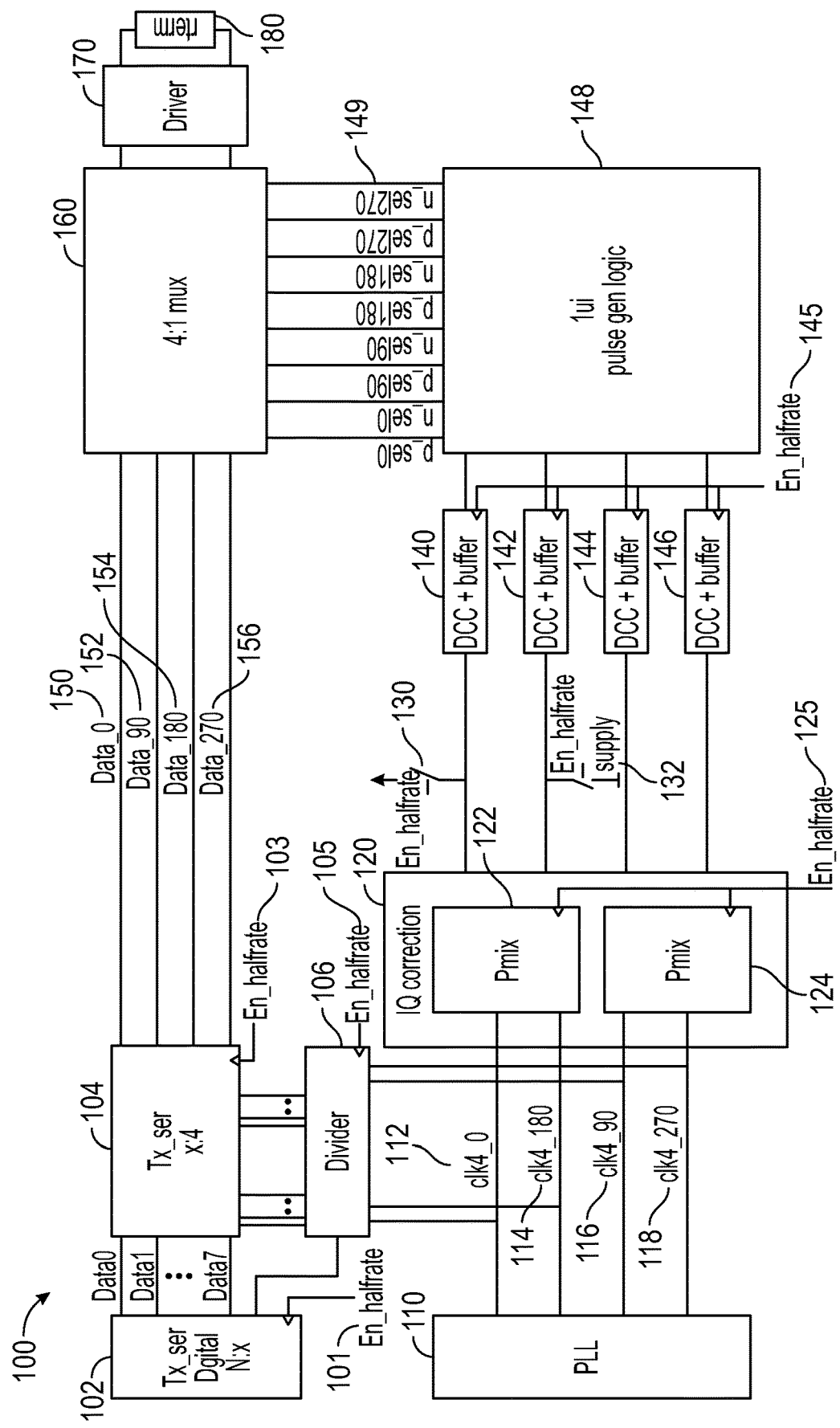
FIG. 1 illustrates an example configurable transmitter for supporting multiple data rates where switches are added to control data transmission to the 4:1 multiplexer.

Aspects of the present disclosure relate to a configurable transmitter architecture which allows for automatically switching the transmitter between a quarter-rate mode and a half-rate mode. This architecture provides the transmitter with the capability to support multiple data rates. Higher data rates are used in the quarter-rate mode and lower data rates are used in the half-rate mode. To implement a lower data rate with a quarter rate mode, a divider with its in-phase and quadrature phase (IQ) and duty cycle correction (DCC) may be used (known as a divider clock path). An advantage of using the exemplary configurable transmitter architecture is that such architecture does not use IQ and DCC calibration in a divider clock path, which saves power and reduces area requirements. The exemplary configurable transmitter architecture uses switches and a 4:1 multiplexer with a 2:1 multiplexer input that leverages both the quarter-rate and half-rate architectures without disturbing timing paths.

Demand for high-bandwidth data transmission continues to increase for systems. Non-return-to-zero (NRZ) modulation has been commonly employed in such data communication links. In NRZ systems, a single bit of information is conveyed in each data symbol transmitted. This has been preferred in many electrical links over other modulation schemes such as pulse amplitude modulation. In 4-level pulse amplitude modulation (PAM-4) serial links, two bits of information are conveyed in each data symbol. This results in better spectral efficiency than NRZ data transmission which is advantageous when transmitted over bandwidth linked channels.

NRZ is a modulation technique using two signal levels to represent the I/O information of a digital logic signal. Logic 0 is a low voltage, and Logic 1 is a high or positive voltage. One bit of logic information can be transmitted or received within each clock period. The baud rate, or the speed at which a symbol can change, equals the bit rate for NRZ signals.

PAM-4 is a technology that uses four different signal levels for signal transmission and each symbol period represents 2 bits of logic information (0, 1, 2, 3). To achieve that, the waveform has four different levels, carrying 2 bits: 00, 01, 10 or 11. With two bits per symbol, the baud rate is half the bit rate.

However, for a given maximum transmit amplitude, this results in a reduction in the transmitted signal-to-noise ratio (SNR) as compared to NRZ data. A serial link may employ feed-forward equalization (FFE), decision feedback equalization (DFE), continuous-time linear equalization, or any combination of these three equalization techniques. These equalization techniques remove inter-symbol interference (ISI) from data transmitted over bandwidth limited channels, making it easier for the receiver to detect the transmitted bit. This is particularly true if the transmitted data symbol has a high inherent SNR, favoring NRZ signaling over PAM signaling.

Despite its SNR advantage, the increased symbol rate is still a drawback for NRZ signaling as compared to PAM-4. One concern lies in the generation of high-quality, high-frequency clocks for serial transceivers. Random jitter specifications for a phase locked loop (PLL) should be tightened as the symbol rate increases, favoring PAM signaling. To date, PAM-4 transmitter architectures have employed a half-rate architecture meaning that one symbol is transmitted on every rising and falling edge of a C2 (half-rate) clock. As an example, for 56 Gb/s PAM-4 data transmission, the symbol rate is 28 Gbaud, and a half-rate transmitter architecture would have a 14 GHz C2 clock (presumable, two complimentary or differential clock signals). Distribution of these high-frequency clocks within a serializer/deserializer (SerDes) may be challenging.

A transmission with NRZ mechanism will have the same baud rate and bitrate because one symbol can carry one bit. 28 Gbps (gigabit per second) bitrate is equivalent to 28 GBdps (gigabaud per second) baud rate. 56 Gbps PAM4 will have a line transmission at 28 GBdps because PAM-4 carries 2 bits per symbol. Therefore, PAM-4 doubles the bit rate for a given baud rate over NRZ, bringing higher efficiency for high-speed optical transmission. However, PAM-4 generates more heat at each end of the SerDes.

In view thereof, the exemplary embodiments present a configurable transmitter that supports both high data rates and low data rates as the transmitter itself is configurable to support multiple data rates by automatically switching between quarter-rate and half-rate architectures without disturbing timing paths. The present disclosure provides several technical advantages. For example, the present invention provides a configurable architecture that can configure the transmitter in quarter-rate (first) and half-rate (second) modes. The quarter-rate mode can be used, for example, in 56 Gbps NRZ signaling, and the half-rate mode can be used, for example, in 28 Gbps NRZ signaling. The advantage of this architecture is that a divider and separate DCC and IQ correction are not used in the divider clock path. Also, power savings can be realized compared to running the transmitter at full rate (56 Gbps NRZ) with bit doubling to implement the 28 Gbps NRZ signaling. In another embodiment, power savings can be realized by keeping bit doubling and simply shutting off two data transmission paths to the 4:1 multiplexer with its corresponding clock path. This further results in less data processing by the 4:1 multiplexer and saves almost half of the power in data path.

FIG. 1 illustrates an example configurable transmitter for supporting multiple data rates where switches are added to control data transmission to the 4:1 multiplexer.

The transmitter 100 can be used in, e.g., wireline transmission where data is serially transmitted from one chip to another chip. In the communication system, the data is given in parallel form to the transmitter, then the data gets encoded in serial form for transmission over a channel, and is received by a receiver, which decodes the data to process it in parallel form. One wireline transmission is referred to as a serializer/deserializer (SerDes). SerDes includes a transmitter and a receiver, and converts parallel data to serial data, and vice versa. The transmitter is a parallel-to-serial converter, and the receiver is a serial-to-parallel converter. SerDes provides data transmission over a single line or single channel to minimize the number of input/output (I/O) pins and interconnects. As SerDes is designed for higher data rates, backward compatibility should be maintained. In other words, new SerDes designs should be able to support previous generation lower data rate architectures. The transmitter 100 can be incorporated into SerDes designs to support such lower data rate architectures.

The data is binary data. The binary data is transmitted as pulse widths. A pulse width is a measure of the elapsed time between the leading edge and trailing edge of a single pulse of energy. The pulse width or pulse time or symbol duration time is the unit interval (UI). The UI is the time in a data stream from each subsequent pulse or symbol.

At a full-rate architecture, if the data rate is 56 Gbps NRZ/112 Gbps PAM-4, the frequency of the high-speed clock is 56 GHz, and a single phase of a clock is used. For a half-rate architecture, if the data rate is 56 Gbps NRZ/112 Gbps PAM-4, the frequency of the high-speed clock is 28 GHz, and two phases of the clock are used. For a quarter-rate architecture, if the data rate is 56 Gbps NRZ/112 Gbps PAM-4, the frequency of the high-speed clock is 14 GHz, and four phases of the clock are used. Thus, for the full-rate architecture, the high-speed clock frequency is the same as the baud rate of the output stream of the transmitter. For the half-rate architecture, the high-speed clock frequency is half of the baud rate of the output stream of the transmitter. For the quarter-rate architecture, the high-speed clock frequency is a quarter of the baud rate of the output stream of the transmitter.

The transmitter 100 includes a digital serializer 102 and a analog serializer 104. In one example, the digital serializer 102 can process 40 UI data. As such, in one instance N=40. Of course, N can be any integer number contemplated by one skilled in the art. The 40 UI data received by the digital serializer 102 are parallel to each other. The digital serializer 102 serializes the 40 parallel data of 40 UI data into 8 UI parallel data (e.g., data 0, data 1, data 2, . . . , data 7). As such, in one instance x=8. Of course, x can be any integer number contemplated by one skilled in the art.

The analog serializer 104 receives the 8 parallel data of 8 UI (e.g., data 0, data 1, data 2, . . . , data 7), and serializes it into four staggered 4 UI data. A 4:1 multiplexer 160 receives the four staggered 4 UI data and serializes it into a single output stream of 1 UI data, such that each bit period is 1 UI. After the data is serialized, it is fed to a driver 170. The driver 170 is used to minimize reflections. For example, the characteristic impedance of the channel can be 500 and the characteristic impedance of a receiver 180 can be 500. The driver 170 driving the single output stream of serialized data, which is 56 Gbps at 1 UI, can have a characteristic impedance equal to the characteristic impedance of the receiver 180 to minimize reflections. An impedance mismatch in a circuit or transmission line or channel can cause or produce a reflection back to the source of the signal. If a signal reflects, the power transferred downstream toward a load is reduced. The driver 170 aids in suppressing such reflections.

In one example, serialization includes three stages. The first stage is the digital stage (N:x) handled by the digital serializer 102. The second stage is the analog stage (x:4) handled by the analog serializer 104 and the third stage includes the 4:1 multiplexer 160. The serialization thus extends to just before the driver 170. To perform the serialization in the analog stage, a clock is provided. The clock can be referred to as a quarter rate clock. The phase lock loop (PLL) 110 is a clock source that generates a clock signal also referred to as a quarter rate clock signal. The PLL 110 synthesizes the highest frequency of the clock. The highest frequency of the clock depends on the output data rate and which architecture is being used, that is full-rate architecture, half-rate architecture, or quarter-rate architecture. As noted above, for output data rate of 56 Gbps NRZ signaling, for the full-rate architecture implementation, the frequency of the high-speed clock is 56 GHZ (1 phase of the clock), for the half-rate architecture implementation, the frequency of the high-speed clock is 28 GHz (2 phases of the clock), and for the quarter-rate architecture implementation, the frequency of the high-speed clock is 14 GHz (4 phases of the clock).

The divider 106 divides the incoming data such that the first data (data 150) is associated with the first phase 112 of the clock (clk4_0), the second data (data 152) is associated with the second phase 116 of the clock (clk4_90), the third data (data 154) is associated with the third phase 114 of the clock (clk4_180), and the fourth data (data 156) is associated with the fourth phase 118 of the clock (clk4_270). Each phase is 14 GHZ, which means using a 4 UI clock at a period of 71.2 pico second (ps).

Also, serialization results in generation of staggered 4 UI data, that is, data Data_0 (or data 150), Data_90 (or data 152), Data_180 (or data 154) and Data_270 (or data 156) with different phases. The 4 UI data are provided to a 4:1 multiplexer 160, which will be described in further detail below with reference to FIG. 2. The 4:1 multiplexer 160 includes four inputs. The first input receives Data_0 150, the second input receives Data_90 152, the third input receives Data_180 154, and the fourth input receives Data_270 156.

Referring back to the PLL 110, the PLL 110 generates four clock signals at different phases, that is, the four phases of the clock signal (clk4_0, clk4_90, clk4_180, and clk4_270 or phase 0, phase 90, phase 180, and phase 270), each having a frequency of 14 GHz. Since four phases of the clock are used, accurate in-phase quadrature phase (IQ) relationships should be established. In-phase and quadrature refer to two sinusoids that have the same frequency and are 90° out of phase. By convention, the I signal is a cosine waveform, and the Q signal is a sine waveform. A sine wave (without any additional phase) is shifted by 90° relative to a cosine wave. Another way to express this is that the sine and cosine waves are in quadrature. To generate a good quality clock, IQ correction and duty cycle correction (DCC) circuitry is used.

The IQ correction circuitry 120 includes a first IQ correction component 122 and a second IQ correction component 124. The IQ correction circuitry 120 also includes a first input 125 for enabling powering down of components (en_halfrate signal). The first IQ correction component 122 can delay or advance the differential in phase clock, i.e., clk4_0 (112)-clk4_180 (114) with respect to differential quadrature phase, i.e., clk4_90 (116)-clk_270 (118). Similarly, the second IQ correction component 124 can delay or advance the differential quadrature phase clock, i.e., clk4_90 (116)-clk4_270 (118) with respect to differential in phase, i.e., clk4_0 (112)-clk_180 (114). The correction adjusted signals clk4_0 (112) and clk4_180 (114) are then provided to DCC circuitry 140 and DCC circuitry 142, respectively. The signals clk4_90 (116) and clk4_270 (118) are then provided to DCC circuitry 144 and DCC circuitry 146, respectively. In one example, the DCC circuitry 140, the DCC circuitry 142, the DCC circuitry 144 and the DCC circuitry 146 each include a buffer. Each buffer can be, e.g., an inverter chain. The DCC circuitry provides for duty cycle correction of each of the signals clk4_0 (112), clk4_180 (114), clk4_90 (116), and clk4_270 (118). The DCC circuitry prevents the duty cycle from getting distorted when it is received by the receiver 180. The DCC circuitry also includes a second input 145 for enabling powering down of components (en_halfrate signal).

Directly between the IQ correction circuitry 120 and the DCC circuitry 140, 142, 144, 146 are a first switch 130 and a second switch 132. The first switch 130 is positioned in the clk4_0 (112) line and the second switch 132 is positioned in the clk4_180 (114) line. The first and second switches can also be referred to as En_halfrate switches as they are configured to switch the transmitter 100 from a quarter-rate mode (first mode) to a half-rate mode (second mode). The first switch 130 is configured to power down the clk4_0 (112) and the second switch 132 is configured to power down the clk4_180 (114) at a half-rate mode. The first and second switches 130, 132 work together to power down the first IQ correction component 122 of the IQ correction circuitry 120. By powering down the first switch 130 and the second switch 132, the transmitter 100 can change operation or mode, that is, the transmitter 100 can become a configurable transmitter that transforms or converts from a quarter-rate mode to a half-rate mode. This enables the transmitter 100 to be backwards compatible or compatible to operate as a previous generation transmitter at half-rate mode. In other words, the transmitter 100 can support multiple data rates or multiple communication protocols. In one example, the transmitter 100 supports 56 Gbps NRZ. In another example, the transmitter 100 supports 28 Gbps NRZ.

Moreover, 1 UI pulse is generated by the pulse generation circuit 148. The 1 UI pulses 149 are, e.g., p_sel0, n_sel0, p_sel90, n_sel90, p_sel180, n_sel180, and p_sel270, n_sel270. These 1 UI pulses 149 are fed into the 4:1 multiplexer 160.

In the quarter-rate mode, all 4 phases of the clock are active. IQ and DCC correction will also be active. The 4:1 multiplexer 160 will select between two 4 UI data streams. In this mode, the 4:1 multiplexer 160 selects the Data_0, Data_90, Data_180, and Data_270 for data_x, data_y, data_z, and data_w, respectively. Then, by using 1 UI pulses, each data is selected one by one to be serialized in a full data rate stream. The final output data will be a 56 Gbps NRZ signal.

Further, in the half-rate mode, the transmitter 100 powers down the clk4_0=0 and clk4_180=1. The switch in the digital serializer 102 enables either bit doubling or bit decimation. Bit doubling means every consecutive bit at the output of the digital serializer 102 is the same, i.e., data0=data1, data2=data3, data4=data5 and data6=data7. Bit decimation means every alternate output of low speed serializer is zero/powered down, i.e., data1=data3=data5=data7=0. The IQ and DCC correction block corresponding to clk4_0 and clk4_180 will also be powered down to save power. In other words, two phases of the clock are powered down and other two phases of the clock remain active, and the first IQ correction component 122 of the IQ correction circuitry 120 is also powered down. The second IQ component 124 of the IQ correction circuitry 120 can act as a buffer. The 4:1 multiplexer 160 is configured such that it selects the Data_90, Data_0, Data_180, and Data_270 for data x, data y, data z, and data w, respectively. The final serialized data will be a 28 Gbps NRZ signal.

The analog serializer 104 includes a switch 103 to power down Data_90 and Data_270. Hence, only two 4 UI data are transmitted from the high-speed serializer 104 to the 4:1 multiplexer 160. The 4 UI data are Data_0 and Data_180. Additionally, the divider 106 also has a switch 105 to power down the divided clock used to serialize Data_90 and Data_270. The powering down of Data_90 and Data_270 results in additional power savings.

Figure 2:
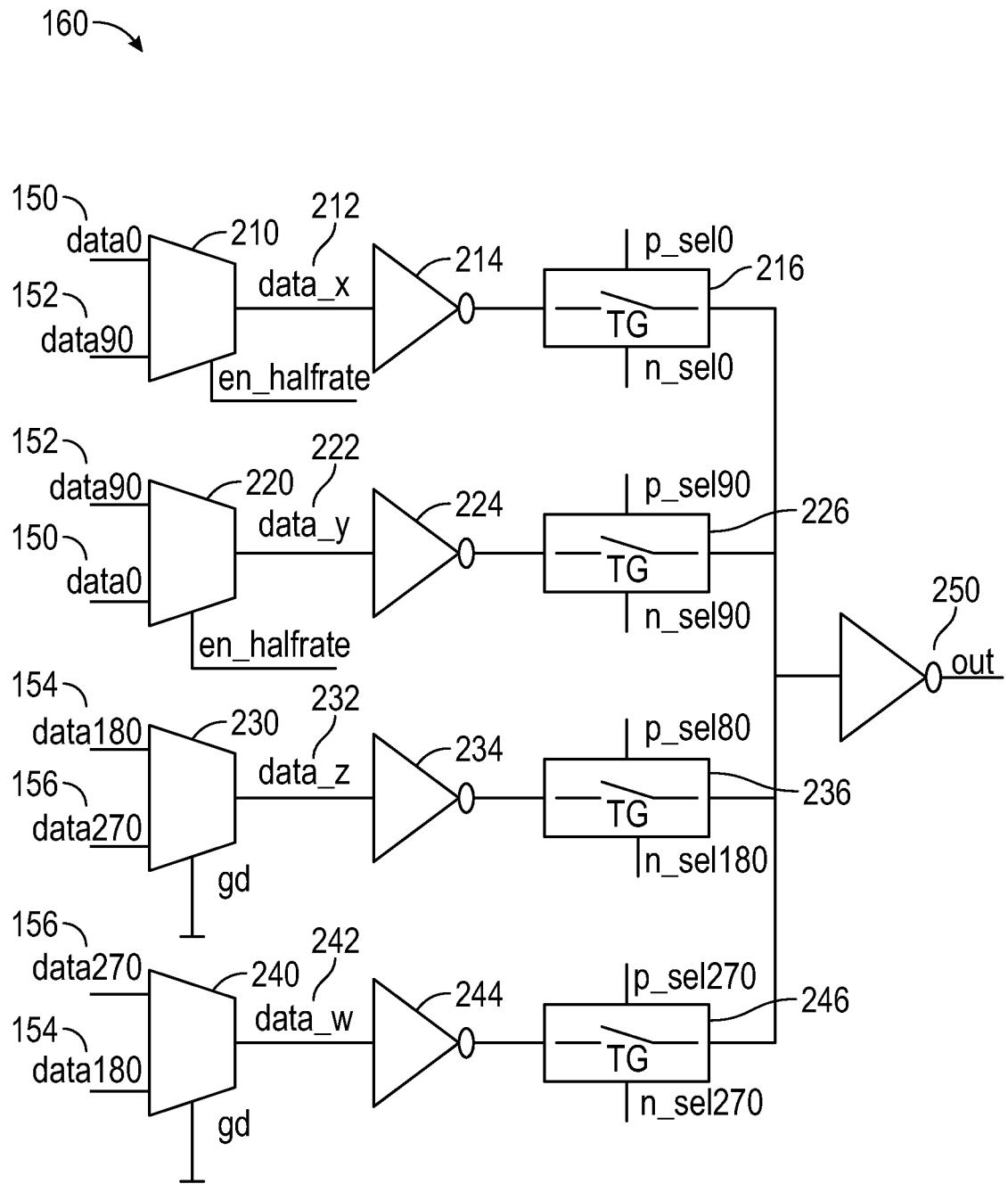
FIG. 2 illustrates an example 4:1 multiplexer having a 2:1 multiplexer input.

FIG. 2 illustrates an example 4:1 multiplexer having a 2:1 multiplexer input.

The 4:1 multiplexer 160 has four inputs. Each input has a 2:1 multiplexer. The first 2:1 multiplexer 210 has two inputs for receiving the data 150 (Data_0) and the data 152 (Data_90). The second 2:1 multiplexer 220 has two inputs for receiving the data 152 (Data_90) and the data 150 (Data_0). The third 2:1 multiplexer 230 has two inputs for receiving the data 154 (Data_180) and the data 156 (Data_270). The fourth 2:1 multiplexer 240 has two inputs for receiving the data 156 (Data_270) and the data 154 (Data_180). The first 2:1 multiplexer 210 and the second 2:1 multiplexer 220 are each configured for accommodating the en_halfrate signals.

The output of the first 2:1 multiplexer 210 is data_x (212), which is provided to an inverter 214, the output of which is fed into a transmission gate 216. Similarly, the output of the second 2:1 multiplexer 220 is data_y (222), which is provided to an inverter 224, the output of which is fed into a transmission gate 226. Similarly, the output of the third 2:1 multiplexer 230 is data_z (232), which is provided to an inverter 234, the output of which is fed into a transmission gate 236. Similarly, the output of the fourth 2:1 multiplexer 240 is data_w (242), which is provided to an inverter 244, the output of which is fed into a transmission gate 246.

The transmission gate 216 has a p-type metal oxide semiconductor (PMOS) and an n-type metal oxide semiconductor (NMOS) for transmitting both 0 and 1. The transmission gate 226 also has a p-type metal oxide semiconductor (PMOS) and an n-type metal oxide semiconductor (NMOS) for transmitting both logic 0 and logic 1. The transmission gate 236 also has a p-type metal oxide semiconductor (PMOS) and an n-type metal oxide semiconductor (NMOS) for transmitting both logic 0 and logic 1. The transmission gate 246 has a p-type metal oxide semiconductor (PMOS) and an n-type metal oxide semiconductor (NMOS) for transmitting both 0 and 1. The transmission gate 216 receives signals p_sel0 and n_sel0 from the pulse generation circuit 148. The transmission gate 226 receives signals p_sel90 and n_sel90 from the pulse generation circuit 148. The transmission gate 236 receives signals p_sel180 and n_sel180 from the pulse generation circuit 148. The transmission gate 246 receives signals p_sel270 and n_sel270 from the pulse generation circuit 148.

The outputs of transmission gate 216, transmission gate 226, transmission gate 236, and transmission gate 246 are provided to an inverter 250.

The first 2:1 multiplexer 210, the second 2:1 multiplexer 220, the third 2:1 multiplexer 230, and the fourth 2:1 multiplexer 240 are configured to select between data inputs. The first 2:1 multiplexer 210 selects between Data_0 and Data_90. The second 2:1 multiplexer 220 selects between Data_90 and Data_0. The third 2:1 multiplexer 230 selects between Data_180 and Data_270. The fourth 2:1 multiplexer 240 selects between Data_270 and Data_180. The phase 0 and the phase 180 of the clock signal are set to logic 0 and logic 1, respectively, so that the 1 UI pulses enabling data_x (212) of the first 2:1 multiplexer 210 and data_w (242) of the fourth 2:1 multiplexer 240 are powered down. The 1 UI pulse generator selects data_y (222) of the second 2:1 multiplexer 220 and data_z (232) of the third 2:1 multiplexer 230 by clock 90 and clock 270, respectively. Each data for a half clock period is selected, which is 2 UI, to operate the transmitter 100 at a half rate mode. In the quarter rate mode, data_x (212) of the first 2:1 multiplexer 210 and data_w (242) of the fourth 2:1 multiplexer 240 are activated such that all four 2:1 multiplexers 210, 220, 230, 240 are now powered on to transmit data.

Figure 3:
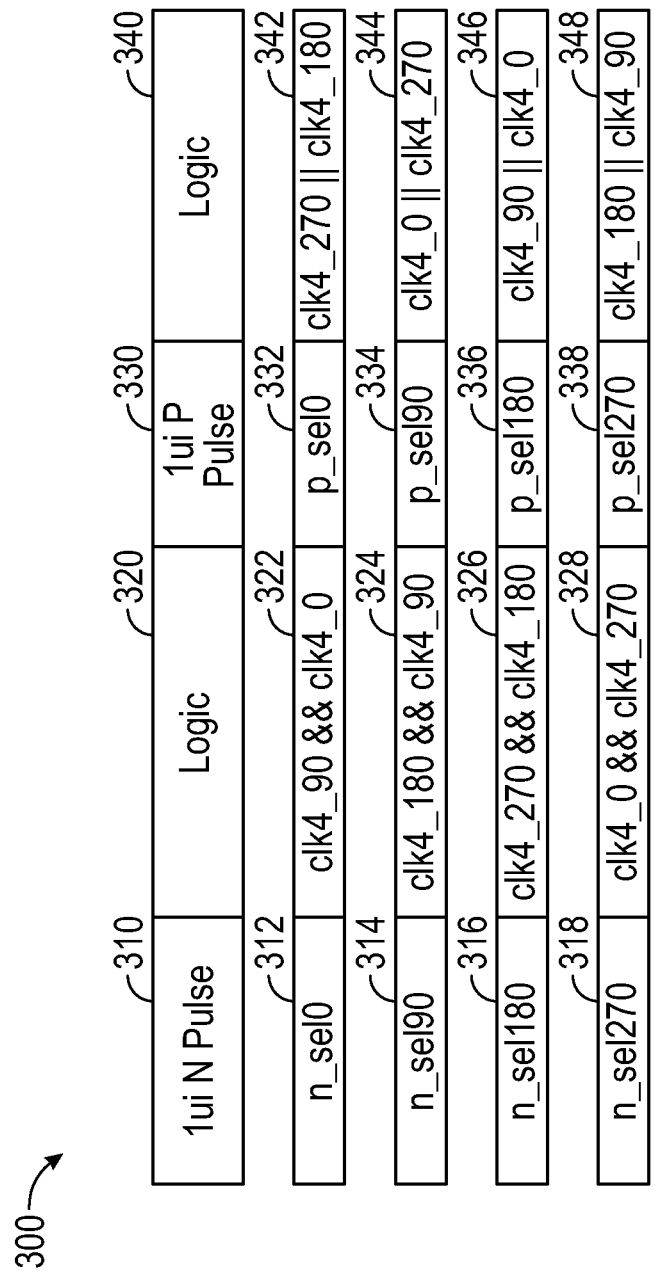
FIG. 3 illustrates an example logic table when the transmitter operates in a quarter-rate mode.

FIG. 3 illustrates an example logic table when the transmitter operates in a quarter-rate mode.

A logic table 300 includes a first column 310 representing 1 UI N pulse, a second column 320 representing logic for the column 310, a third column 330 representing 1 UI P pulse, and a fourth column 340 representing logic for the column 330.

When AND logic 322 receives inputs clk4_90 and clk4_0 (clk4_90 && clk4_0), n_sel0 (312) is generated to drive the NMOS of transmission gate 216 of the 4:1 multiplexer 160.

When AND logic 324 receives inputs clk4_180 and clk4_90 (clk4_180 && clk4_90), n_sel90 (314) is generated to drive the NMOS of transmission gate 226 of the 4:1 multiplexer 160.

When AND logic 326 receives inputs clk4_270 and clk4_180 (clk4_270 && clk4_180), n_sel180 (316) is generated to drive the NMOS of transmission gate 236 of the 4:1 multiplexer 160.

When AND logic 328 receives inputs clk4_0 and clk4_270 (clk4_0 && clk4_270), n_sel270 (318) is generated to drive the NMOS of transmission gate 246 of the 4:1 multiplexer 160.

When OR logic 342 receives inputs clk4_270 and clk4_180 (clk4_270||clk4_180), p_sel0 (332) is generated to drive the PMOS of transmission gate 216 of the 4:1 multiplexer 160.

When OR logic 344 receives inputs clk4_0 and clk4_270 (clk4_0||clk4_270), p_sel90 (334) is generated to drive the PMOS of transmission gate 226 of the 4:1 multiplexer 160.

When OR logic 346 receives inputs clk4_90 and clk4_0 (clk4_90||clk4_0), p_sel180 (336) is generated to drive the PMOS of transmission gate 236 of the 4:1 multiplexer 160.

When OR logic 348 receives inputs clk4_180 and clk4_90 (clk4_180||clk4_90), p_sel270 (338) is generated to drive the PMOS of transmission gate 246 of the 4:1 multiplexer 160.

The selections from table 300 can be further visualized with a timing diagram, described below with reference to FIG. 4B.

Figure 4A:
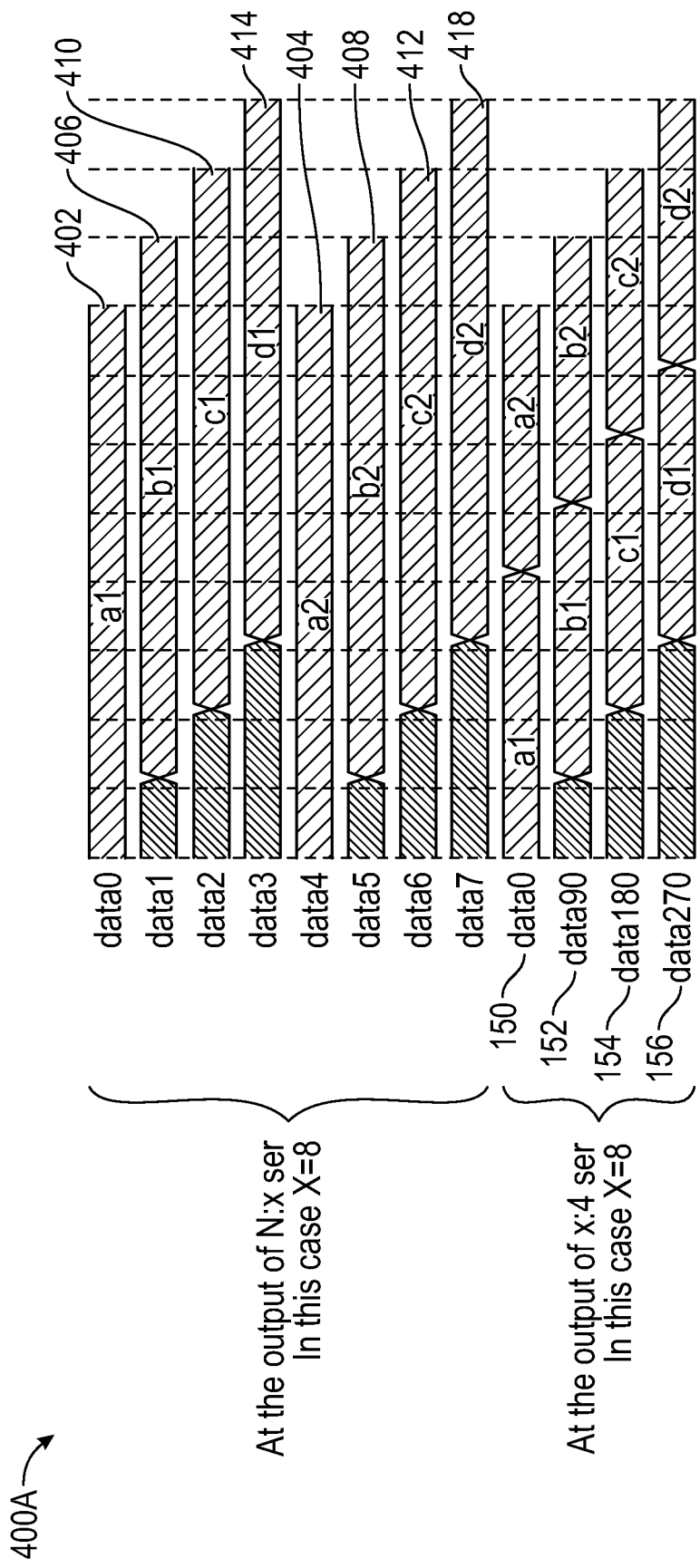
FIG. 4A illustrates an example timing diagram at the output of the digital serializer, when the transmitter operates in a quarter-rate mode.

FIG. 4A illustrates an example timing diagram 400A at the output of the digital serializer, when the transmitter operates in a quarter-rate mode.

As noted in FIG. 1 above, the digital serializer 102 serializes the 40 parallel data of 40 UI data into 8 UI parallel data. The 8 UI parallel data are data 0, data 1, data 2, data 3, data 4, data 5, data 6, and data 7. Data 0 includes data a1 (402), data 1 includes data b1 (406), data 2 includes data c1 (410), data 3 includes data d1 (414), data 4 includes data a2 (404), data 5 includes data b2 (408), data 6 includes data c2 (412), and data 7 includes data d2 (418). The 8 UI parallel data are output from the digital serializer 102.

In this configuration, the enable half rate is activated. When entering into the half rate mode, the same data needs to be transmitted, that is, data a1, b1, c1, d1, a2, b2, c2, d2. However, only the width of this data has increased from 1 UI to 2 UI. In other words, the output needs to be 2 UI of a1, 2 UI of b1, 2 UI of c1, 2 UI of d1, 2 UI of a2, 2 U of b2, 2 UI of c2, and 2 UI of d2, as shown by 150-156 in FIG. 4A.

When the enable half rate is activated (half-rate mode), there are two implementations. In the first implementation, bit doubling is performed. When bit doubling is performed, the output of the digital serializer 102 includes a1, a1, b1, b1, c1, c1, etc. In other words, the data is doubled. If no power down occurs, then the output from the analog serializer 104 is a1, a1, b1, b1, etc., since bit doubling has been enabled. However, in this first implementation, there is a redundancy of data, since only one a1, b1, c1, d1 is needed. In order to avoid this redundancy of data, in a second implementation, bit decimation is performed to reduce power. When bit decimation is performed, every alternate bit is set to logic 0. In other words, at the input of the analog serializer 104, the 8 bits of data coming in is a1, 0, b1, 0, c1, 0, d1, 0. The output of the analog serializer 104 is then a1, 0, b1, 0, which is fed to the 4:1 multiplexer 160. Thus, every alternate bit data is powered down or set to logic 0.

Therefore, in one implementation, bit doubling can be performed, where no power savings is achieved in the digital serializer 102, and redundant data is present, or in another implementation, bit decimation can be performed where every alternate bit is powered down or set to logic 0 to eliminate redundant data, and achieve power savings by employing the enable half rate. Since the analog serializer 104 is connected to the divider 106, which includes a divider clock that generates the clock signal. To perform serialization, the powering down of the alternate bits at the output of the digital serializer 102 before being received by the high-speed digital analog serializer 104 cause the corresponding bits of the divider clock of the divider 106 to also be powered down.

Figure 4B:
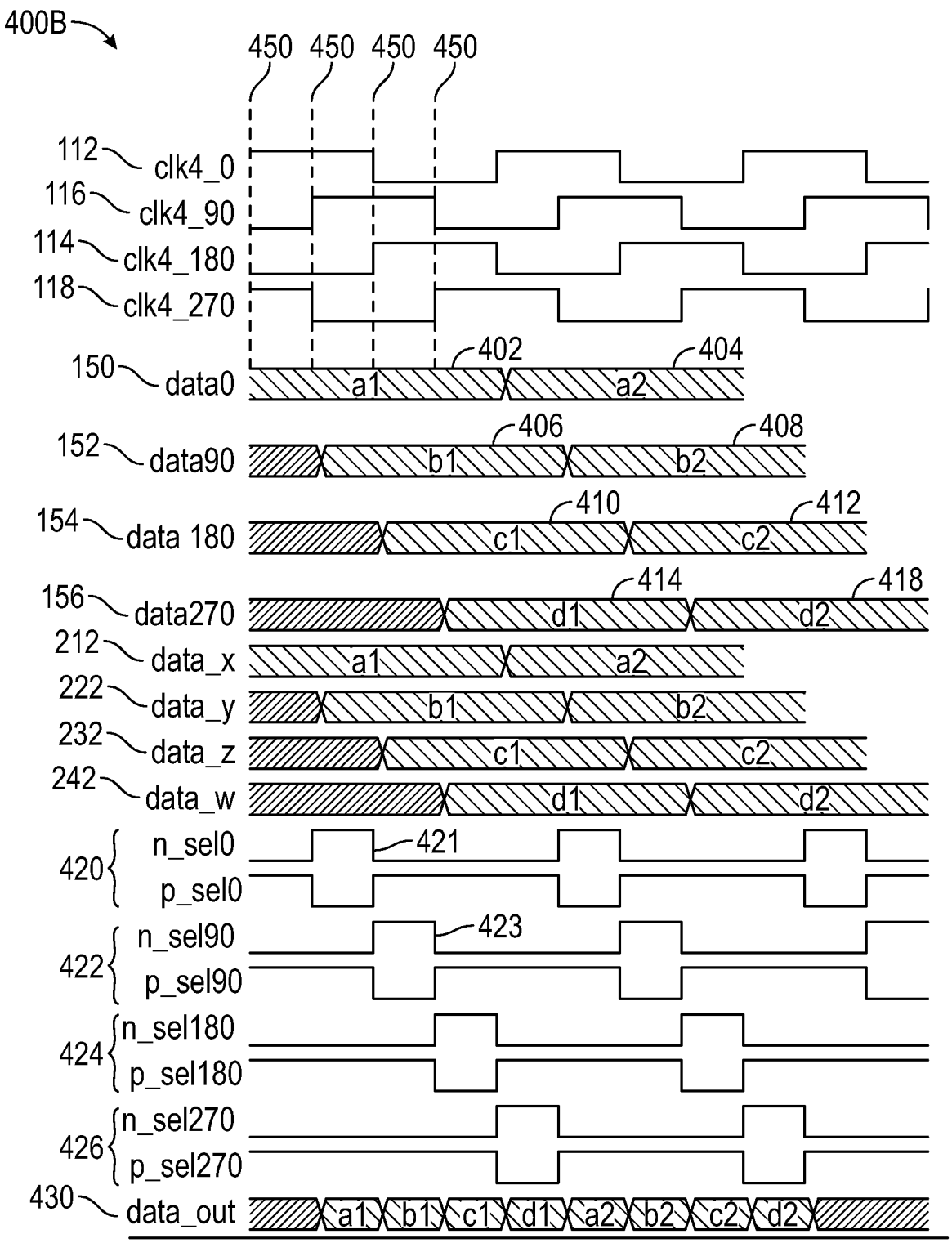
FIG. 4B illustrates an example timing diagram at the output of the analog serializer, when the transmitter operates in a quarter-rate mode.

FIG. 4B illustrates an example timing diagram 400B at the output of the analog serializer when the transmitter operates in a quarter-rate mode.

The timing diagram 400B illustrates the four phases of the clock signal at a top portion. The four phases of the clock signal are clk4_0 (112), clk4_90 (116), clk4_180 (114), and clk4_270 (118). Underneath the four phases of the clock signal depicted are Data_0 (150), Data_90 (152), Data_180 (154), and Data_270 (156). Data_0 includes data a1 (402) and data a2 (404). Data_90 includes data b1 (406) and data b2 (408). Data_180 includes data c1 (410) and data c2 (412). Data_270 includes data d1 (414) and data d2 (418). The timing diagram 400B then illustrates the data selected by the 4:1 multiplexer 160, that is, data_x (212), data_y (222), data_z (232), and data_w (242). Data_x includes data a1 (402) and data a2 (404). Data_y includes data b1 (406) and data b2 (408). Data_z includes data c1 (410) and data c2 (412). Data_w includes data d1 (414) and data d2 (418). The transmission gate signals are then shown. The transmission gate 216 is selected by transmission gate signals p_sel0 and n_sel0, the transmission gate 226 is selected by transmission gate signals p_sel90 and n_sel90, the transmission gate 236 is selected by transmission gate signals p_sel180 and n_sel180, and the transmission gate 246 is selected by transmission gate signals p_sel270 and n_sel270.

Each of the four data, that is, data_0, data_90, data_180, and data_270, have a period of 4 UI. A space between vertical lines 450 in the timing diagram 400B represents 1 UI. As such, each data spans 4 UI. The data_0, data_90, data_180, and data_270 are being received in a staggered manner. Data_90 is offset by 1 UI from data_0. Data_180 is offset by 2 UI from data_0. Data_270 is offset by 3 UI from data_0. Stated differently, data_90 is offset by 1 UI from data_0. Data_180 is offset by 1 UI from data_90. Data_270 is offset by 1 UI from data_180. The positional relationship of the data data_x, data_y, data_z, data_w is similar to the positional relationship of the data_0, data_90, data_180, and data_270.

Regarding the signals from the transmission gates 216, 226, 236, 246, when 322 (clk4_90 && clk4_0) and 342 (clk4_270||clk4_180) is applied, pulses 420 are generated for n_sel0 and p_sel0. When logic 324 (clk4_180 && clk4_90) and 344 (clk4_0||clk4_270) is applied, pulses 422 are generated for n_sel90 and p_sel90. When logic 326 (clk4_270 && clk4_180) and 346 (clk4_90||clk4_0) is applied, pulses 424 are generated for n_sel180 and p_sel180. When logic 328 (clk4_0 && clk4_270) and 348 (clk4_180||clk4_90) is applied, pulses 426 are generated for n_sel270 and p_sel270. It is noted that pulses 420, 422, 424, 426 are periodic. Further, the pulses 420, 422, 424, 426 each have a width of 1 UI.

Thus, if such pulses are generated for the four phases of the clock, and such data is provided to the 2:1 multiplexer 210, 220, 230, 240 of the 4:1 multiplexer 160, a single serialized data output 430 is obtained including data a1, b1, c1, d1, a2, b2, c2, d2 (data_out). Each piece of data is 1 UI. There are also timing requirements that should be considered when selecting the data. For example, when selecting data a1, such data should be available before the pulse section 421 of the first pulse 420 (of n_sel0 and p_sel0) and after the pulse section 421 of the first pulse 420 (of n_sel0 and p_sel0). This is beneficial in selecting data a1 reliably. Similarly, when selecting data b1, such data should be available before the pulse section 423 of the second pulse 422 (of n_sel90 and p_sel90) and after the pulse section 423 of the second pulse 422 (of n_sel90 and p_sel90). This also holds true for the selection of data c1 and d1.

As such, in FIG. 4B, when N=40 (for the digital serializer 102) and X=8 (for the analog serializer 104), 40 bits of data enter the digital serializer 102 and 8 bits of data are output from the digital serializer 102. The 8 bits of data are fed into the analog serializer 104. The 8 bits of data are a1 (402), a2 (404), b1 (406), b2 (408), c1 (410), c2 (412), d1 (414), and d2 (418). The output of the analog serializer 104 includes 4 UI data that are fed to the 4:1 multiplexer 160, which outputs a single serialized data output 430 (data_out). As such, the three stages of serialization are employed to output the single serialized data output 430 (data_out). In this configuration, the enable half rate is not activated.

FIG. 5 illustrates an example logic table when the transmitter operates in a half-rate mode.

A logic table 500 includes a first column 510 representing 1 UI N pulse, a second column 520 representing logic for the column 510, a third column 530 representing 1 UI P pulse, and a fourth column 540 representing logic for the column 530. When clk4_0 is set to logic 0 and clk4_180 is set to logic 1, then the following is obtained:

When logic 322 is applied with clk4=0 and clk4_180=1, n_sel0 (512) becomes logic 522 (logic 0) which is generated to drive NMOS of transmission gate 216 of the 4:1 multiplexer 160.

When logic 324 is applied with clk4=0 and clk4_180=1, n_sel90 (514) becomes logic 524 (clk4_90) which is generated to drive NMOS of transmission gate 226 of the 4:1 multiplexer 160.

When logic 326 is applied with clk4=0 and clk4_180=1, n_sel180 (516) becomes logic 526 (clk4_270) which is generated to drive NMOS of transmission gate 236 of the 4:1 multiplexer 160.

When logic 328 is applied with clk4=0 and clk4_180=1, n_sel270 (518) becomes (logic 0) which is generated to drive NMOS of transmission gate 246 of the 4:1 multiplexer 160.

When logic 342 is applied with clk4=0 and clk4_180=1, p_sel0 (532) becomes logic 542 (logic 1) which is generated to drive PMOS of transmission gate 216 of the 4:1 multiplexer 160.

When logic 344 is applied with clk4=0 and clk4_180=1, p_sel90 (534) becomes logic 544 (clk4_270) which is generated to drive PMOS of transmission gate 226 of the 4:1 multiplexer 160.

When logic 346 is applied with clk4=0 and clk4_180=1, p_sel180 (536) becomes logic 546 (clk4_90) which is generated to drive PMOS of transmission gate 236 of the 4:1 multiplexer 160.

When logic 348 is applied with clk4=0 and clk4_180=1, p_sel270 (538) becomes logic 548 (logic 1) which is generated to drive PMOS of transmission gate 246 of the 4:1 multiplexer 160.

Therefore, the logic in FIGS. 3 and 5 is the same. However, when clk0 is changed to logic 0 and clk180 is changed to logic 1, the logic table of FIG. 3 is simplified to the logic table of FIG. 5.

The selections from table 500 can be further visualized with a timing diagram, described below with reference to FIG. 6A.

Figure 6A:
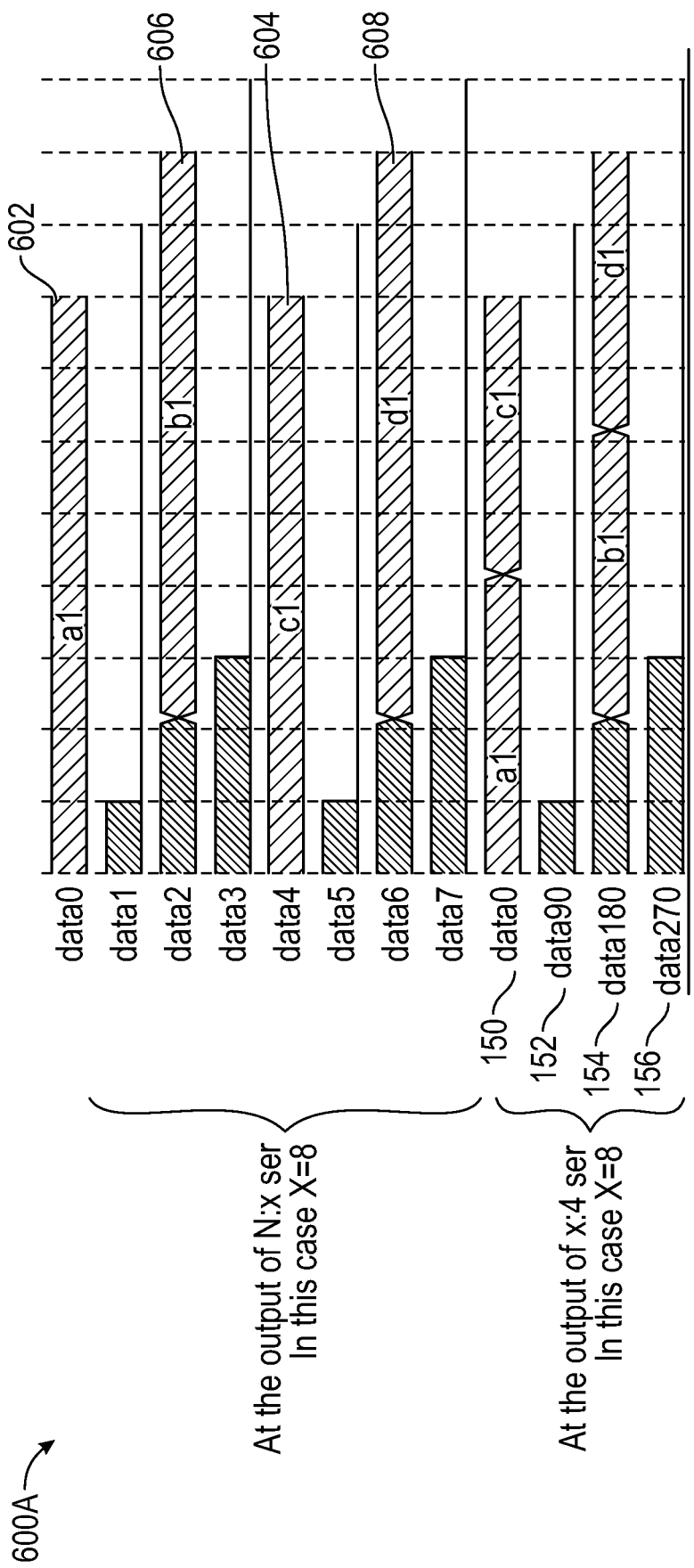
FIG. 6A illustrates an example timing diagram at the output of the digital serializer, when the transmitter operates in a half-rate mode.

FIG. 6A illustrates an example timing diagram 600A at the output of the digital serializer, when the transmitter operates in a half-rate mode.

As noted in FIG. 1 above, the digital serializer 102 serializes the 40 parallel data of 40 UI data into 8 UI parallel data. The 8 UI parallel data are data 0, data 1, data 2, data 3, data 4, data 5, data 6, and data 7. Data 0 includes data a1 (602), data 1 is zero, data 2 includes data b1 (606), data 3 is zero, data 4 includes data c1 (604), data 5 is zero, data 6 includes data d1 (608), and data 7 is zero. The 8 UI parallel data are output from the digital serializer 102. Therefore, in the half rate mode, the data sent from the digital serializer 102 is a1, 0, b1, 0, c1, 0, d1, 0.

Once again, when the enable half rate is activated (half-rate mode), there are two implementations. In the first implementation, bit doubling is performed. When bit doubling is performed, the output of the digital serializer 102 includes a1, a1, b1, b1, c1, c1, etc. In other words, the data is doubled. However, in this first implementation, there is a redundancy of data, since only one a1, b1, c1, d1 is needed. In order to avoid this redundancy of data, in a second implementation, and to reduce power consumption, every alternate bit is set to logic 0, as shown in FIG. 6A. In other words, at the input of the analog serializer 104, the 8 bits of data coming in is a1, 0, b1, 0, c1, 0, d1, 0. The output of the analog serializer 104 is then a1, 0, b1, 0, which is fed to the 4:1 multiplexer 160. Thus, every alternate bit data is powered down or set to logic 0.

Figure 6B:
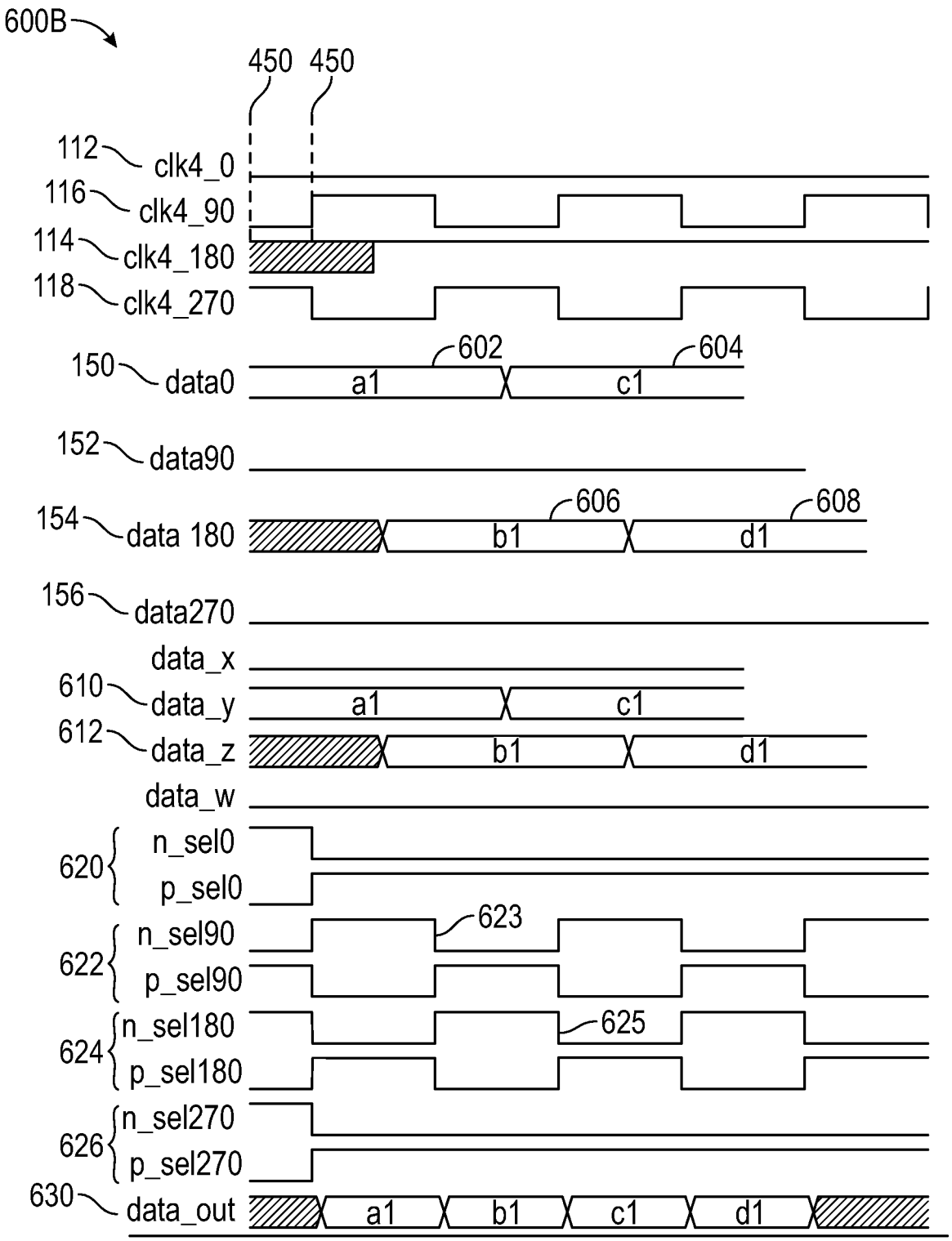
FIG. 6B illustrates an example timing diagram at the output of the analog serializer, when the transmitter operates in a half-rate mode.

FIG. 6B illustrates an example timing diagram 600B at the output of the analog serializer when the transmitter operates in a half-rate mode.

The timing diagram 600B illustrates the four phases of the clock signal at a top portion. The four phases of the clock signal are clk4_0 (112), clk4_90 (116), clk4_180 (114), and clk4_270 (118). Underneath the four phases of the clock signal depicted are the Data_0 (150), Data_90 (152), Data_180 (154), and Data_270 (156). Data_0 includes data a1 (602) and data c1 (604), as such bit doubling is enabled in the serializer 102 by switch 101 as noted in FIG. 1. Data_90 is set to logic 0, as such signal has been powered down by switch 103 as noted in FIG. 1. Data_180 includes data b1 (606) and data d1 (608) as such bit doubling is enabled in the serializer 102 by switch 101 as noted in FIG. 1. Data_270 is also set to logic 0, as such signal has been powered down by switch 103 as noted in FIG. 1.

The timing diagram 600B then illustrates the data selected by the 4:1 multiplexer 160, that is, data_y (610) and data_z (612). Data_x and data_w are zero as such signal's lines have been powered down. Data_y includes data a1 (602) and data c1 (604). Data_z includes data b1 (606) and data d1 (608). As such, the Data_0 and Data_180 are the same as data_y and data_z. The bit doubling is being performed at the digital serializer 104 (FIG. 1). The transmission gate signals are then shown.

The transmission gate 216 is selected by signals p_sel0 and n_sel0, the transmission gate 226 is selected by signals p_sel90 and n_sel90, the transmission gate 236 is selected by signals p_sel180 and n_sel180, and the transmission gate 246 is selected by signals p_sel270 and n_sel270.

Each of the two data, data_0 and data_180, have a period of 4 UI. A space between vertical lines 450 in the timing diagram 600B represent 1 UI with respect to full rate. Thus, each data spans 4 UI. The data_0 and data_180 is being received in a staggered manner. Data_0 is offset by 2 UI from data_180.

Regarding the signals from the transmission gates 216, 226, 236, 246, with clk4_0=0 and clk4_180=1, when 322 (clk4_90 && clk4_0) and 342 (clk4_270∥clk4_180) is applied, n_sel0 becomes 0 and p_sel0 becomes 1 (signals 620). With clk4_0=0 and clk4_180=1, when logic 324 (clk4_180 && clk4_90) and 344 (clk4_0∥clk4_270) is applied, pulses 622 are generated for n_sel90 and p_sel90. With clk4_0=0 and clk4_180=1, when logic 326 (clk4_270 && clk4_180) and 346 (clk4_90∥clk4_0) is applied, pulses 624 are generated for n_sel180 and p_sel180. With clk4_0=0 and clk4_180=1, when logic 328 (clk4_0 && clk4_270) and 348 (clk4_180∥clk4_90) is applied, n_sel270 becomes 0 and p_sel270 becomes 1 (signals 626). It is noted that pulses 622, 624 are periodic. Further, the pulses 622, 624 each have a width of 2 UI.

Thus, if such pulses are generated for the four phases of the clock, and such data is provided to the 2:1 multiplexer 210, 220, 230, 240 of the 4:1 multiplexer 160, a single serialized data output 630 is obtained including data a1, b1, c1, d1 (data_out). Each piece of data is 2 UI.

There are also timing requirements that should be considered when selecting the data. For example, when selecting data a1, such data should be available before and after the pulse section 623 of the pulse 622 (of n_sel90 and p_sel90). This is beneficial in selecting data a1 reliably. Similarly, when selecting data b1, such data should be available before and after the pulse section 625 of pulse 624 (of n_sel90 and p_sel90). This is beneficial in selecting data b1 reliably.

Therefore, to transition from a quarter-rate architecture (or quarter rate mode) to a half-rate architecture (or half rate mode), one switch of the transmitter is enabled, which will power down the clk4_0=logic 0 and clk4_180=logic 1, and respective IQ and DCC circuits, where the 4:1 multiplexer includes 2:1 multiplexer inputs such that the 2:1 multiplexer inputs provide for a signal or data selection process to enable proper timing of data when the data rate is cut in half. Additionally, bit doubling or bit decimation is performed at the serializer. The transmitter architecture is thus chosen based on data rate demand, process node, and power area constraints. An advantage of using the exemplary configurable transmitter architecture is that such architecture does not use IQ and DCC calibration in a divided path which saves power and reduces area requirements.

As such, since the phase 0 and the phase 180 of the clock signal are set to logic 0 and logic 1, respectively, the 1 UI pulses enabling data_x and data_w are always off. The 1 UI pulse generator selects data_y and data_z by clock 90 and clock 270, respectively. Each data for a half clock period is selected, which is 2 UI, to operate the transmitter 100 at a half rate, as the output data or output stream is changing every 2 UI instead of every 1 UI. Power savings are also achieved as the IQ and DCC circuits are shut down, thus consuming no power when the two switches are powered down. Power savings are further achieved by effectively shutting off two of the 2:1 multiplexer inputs when transitioning to the half-rate mode.

To summarize, to transition from a quarter-rate architecture (or quarter-rate mode) to a half-rate architecture (or half-rate mode), one switch of the transmitter is enabled, which will power down the clk4_0=logic 0 and clk4_180=logic 1, and respective IQ and DCC circuits, where the 4:1 multiplexer 160 (FIG. 1) includes 2:1 multiplexer inputs 210, 220, 230, 240 (FIG. 2) such that the 2:1 multiplexer inputs 210, 220, 230, 240 provide for a signal or data selection process to enable proper timing of data when the data rate is cut in half. Additionally, bit doubling or bit duplication is performed in this instance, by the digital serializer 102. Further, signals for data_90 and data_270 can be powered down such that remaining 4 UI data stream data_0 and data_180 can be transmitted from the analog serializer 104. Power savings can be achieved as less data is being transmitted and less processing is being performed by the 4:1 multiplexer 160, which only processes half the incoming data. This, in turn, results in the transmission gates 216, 226, 236, 246 (FIG. 2) processing half of the incoming data.

Figure 7:
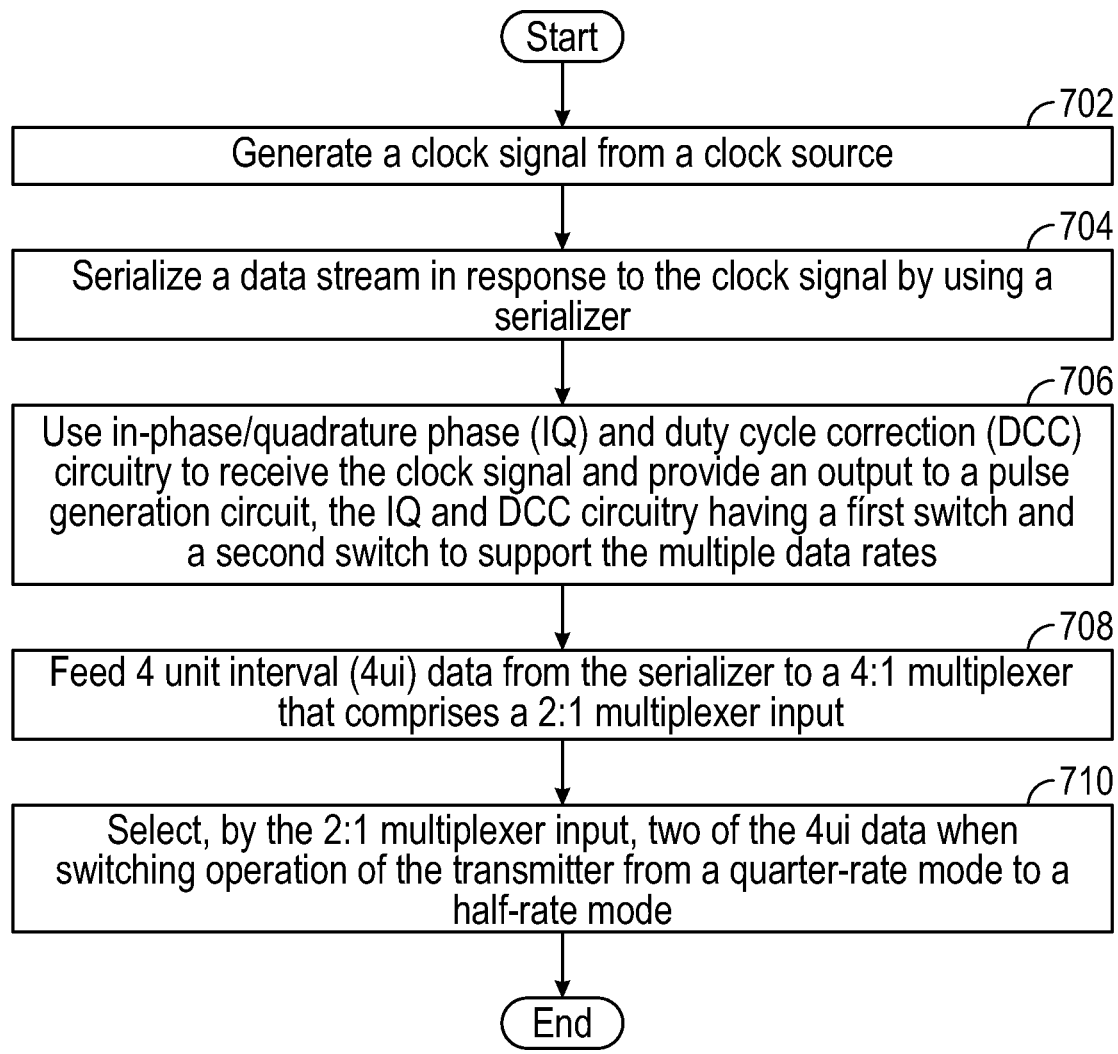
FIG. 7 is a flowchart of an example method for enabling the transmitter to support multiple data rates.

FIG. 7 is a flowchart of an example method for enabling the transmitter to support multiple data rates.

At 702, the present system generates a clock signal from a clock source. The transmitter uses one high-speed clock which is used in the last stage of serialization. For the other initial stages of serialization, the divided clock can be generated from this high-speed clock. This high-speed clock is synthesized by using a PLL. The frequency of the high-speed clock depends on the data-rate and transmitter architecture. The transmitter architecture is chosen based on data rate demand, process node, and power area constraints.

At 704, the present system serializes a data stream in response to the clock signal by using a serializer. In one example, the serializer is a two-stage serializer. The first stage of the serializer includes a serializer (digital) and the second stage of the serializer includes a high-speed serializer (analog). The serializer (digital) is configured to assist with bit doubling when the transmitter transitions from a quarter-rate mode of operation to a half-rate mode of operation.

At 706, the present system includes in-phase/quadrature phase (IQ) and duty cycle correction (DCC) circuitry to receive the clock signal and provide an output to a pulse generation circuit, the IQ and DCC circuitry having a first switch and a second switch configured to support the multiple data rates. The first switch 130 is positioned in the clk4_0 (112) line and the second switch 132 is positioned in the clk4_180 (114) line. The first and second switches can also be referred to as En_halfrate switches as they are configured to switch the transmitter 100 from a quarter-rate mode to a half-rate mode. The first switch 130 is configured to power down the clk4_0 (112) and the second switch is configured to power down the clk4_180 (114). The first and second switches work together to power down the first IQ correction component 122 of the IQ correction circuitry 120. By powering down the first switch 130 and the second switch 132, the transmitter 100 can change operation or mode, that is, the transmitter 100 can become a configurable transmitter that transforms or converts from a quarter-rate mode to a half-rate mode. This enables the transmitter 100 to be backwards compatible.

At 708, the present system feeds 4 unit interval (4 UI) data from the serializer to a 4:1 multiplexer that includes four inputs each having a 2:1 multiplexer input. The first 2:1 multiplexer 210 has two inputs for receiving the data 150 (Data_0) and the data 152 (Data_90). The second 2:1 multiplexer 220 has two inputs for receiving the data 152 (Data_90) and the data 150 (Data_0). The third 2:1 multiplexer 230 has two inputs for receiving the data 154 (Data_180) and the data 156 (Data_270). The fourth 2:1 multiplexer 240 has two inputs for receiving the data 156 (Data_270) and the data 154 (Data_180). The first 2:1 multiplexer 210 and the second 2:1 multiplexer 220 are each configured for accommodating the en_halfrate signals.

At 710, the present system selects, by the 2:1 multiplexer input, two of the 4 UI data when switching operation of the transmitter from a quarter-rate mode to a half-rate mode. If such pulses are generated for the four phases of the clock, and such data is provided to the 2:1 multiplexers 210, 220, 230, 240 of the 4:1 multiplexer 160, a serialized output 630 is obtained including data a1, b1, a2, b2 (data_out). Each piece of data is 2 UI.

Figure 8:
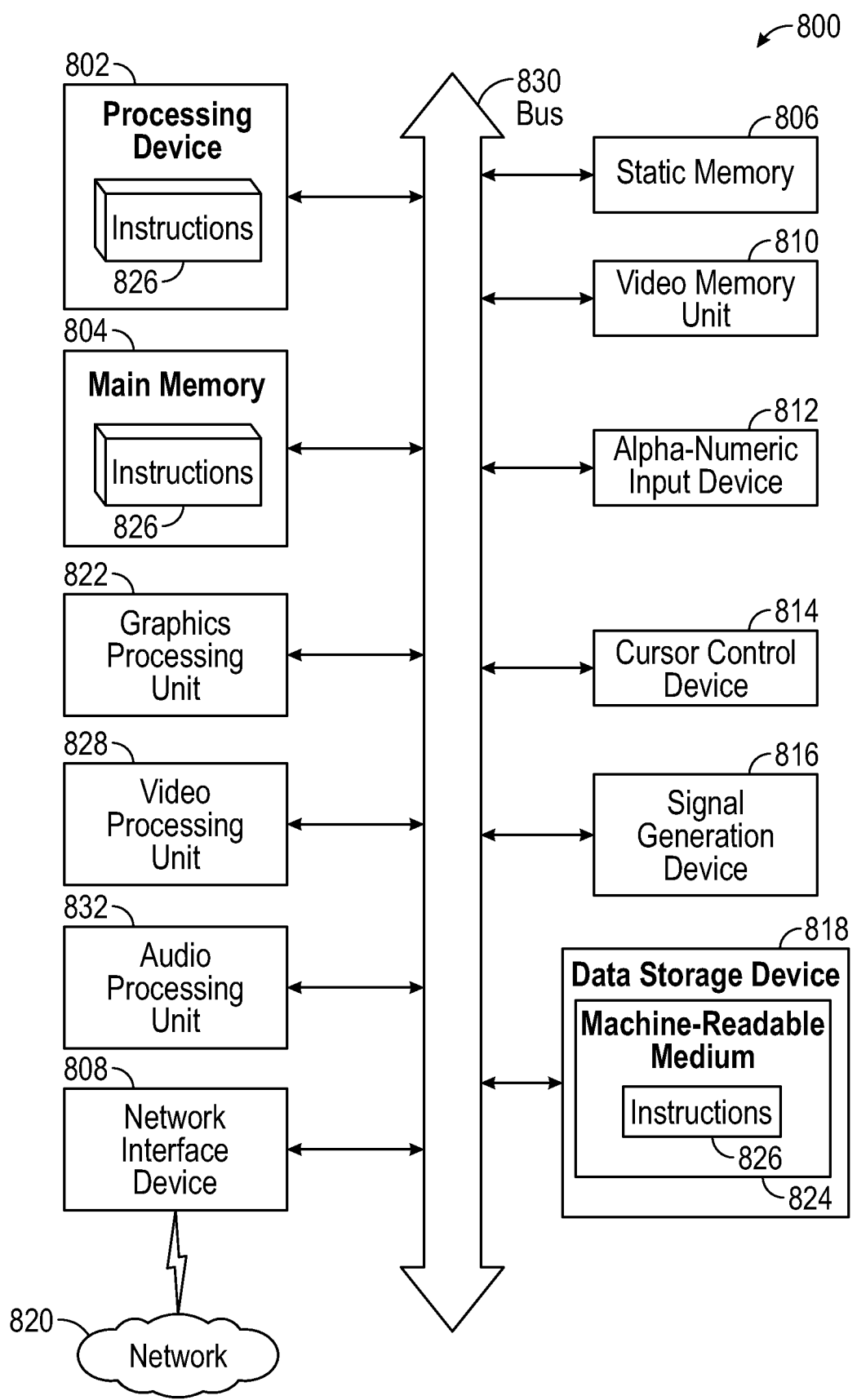
FIG. 8 illustrates an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementation of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. An electronic circuit comprising:
   a clock source configured to generate a clock signal;
   an analog serializer that serializes a data stream in response to the clock signal to output N data in parallel;
   a pulse generation circuit coupled to the clock signal, wherein a first switch and a second switch electrically communicate with the pulse generation circuit; and
   a multiplexer coupled to the pulse generation circuit, wherein the multiplexer receives the N data from the analog serializer and selects a subset of the N data when switching operation of the electronic circuit from a first mode to a second mode.

2. The electronic circuit of claim 1, wherein the clock source is a phase locked loop (PLL) and the clock signal is a quarter rate clock signal having four phases.

3. The electronic circuit of claim 2, wherein the four phases of the quarter rate clock signal are a 0 degree phase, a 90 degree phase, a 180 degree phase, and a 270 degree phase.

4. The electronic circuit of claim 3, wherein the first switch controls the 0 degree phase of the quarter rate clock signal and the second switch controls the 180 degree phase of the quarter rate clock signal.

5. The electronic circuit of claim 4, wherein, when the first switch and the second switch are powered down, both the 0 degree phase and the 180 degree phase of the quarter rate clock signal are inactive, resulting in the electronic circuit switching operation from the first mode to the second mode.

6. The electronic circuit of claim 5, wherein in-phase/quadrature phase (IQ) and duty cycle correction (DCC) circuitry receives the clock signal and provides an output to the pulse generation circuit.

7. The electronic circuit of claim 6, wherein, when the first switch and the second switch are powered down, the IQ and DCC circuitry associated with the 0 degree phase and the 180 degree phase of the quarter rate clock signal are also powered down.

8. The electronic circuit of claim 7, wherein, when the four phases of the quarter rate clock signal are active, the IQ and DCC circuitry is active, and the electronic circuit operates in the first mode, the first mode being a quarter-rate mode.

9. The electronic circuit of claim 1, wherein the pulse generation circuit generates a 1 UI pulse to serialize a subset of the data to produce a single serialized data output.

10. The electronic circuit of claim 1, wherein a digital serializer is in communication with the analog serializer.

11. The electronic circuit of claim 10, wherein the digital serializer is configured to perform either bit duplication or bit decimation on the data stream to enable the electronic circuit to switch operation from the first mode to the second mode.

12. The electronic circuit of claim 10,
wherein logic is added and controlled by switches to perform either bit duplication where every consecutive bit is same or bit decimation to power down every alternate bit at an output of the digital serializer to transmit a subset of the data from the analog serializer to the multiplexer; and
wherein a divider connected to the analog serializer includes a switch to power down a divided clock.

13. A method for enabling an electronic circuit to support multiple data rates, the method comprising:
generating a clock signal from a clock source;
serializing, by an analog serializer, a data stream in response to the clock signal to output N data in parallel;
coupling a pulse generation circuit to the clock signal, wherein a first switch and a second switch electrically communicate with the pulse generation circuit; and
coupling a multiplexer to the pulse generation circuit, wherein the multiplexer receives the N data from the analog serializer and selects a subset of the N data when switching operation of the electronic circuit from a first mode to a second mode.

14. The method of claim 13, wherein the clock signal is a quarter rate clock signal having four phases, the four phases being a 0 degree phase, a 90 degree phase, a 180 degree phase, and a 270 degree phase.

15. The method of claim 14, wherein the first switch controls the 0 degree phase of the quarter rate clock signal and the second switch controls the 180 degree phase of the quarter rate clock signal.

16. The method of claim 15, wherein, when the first switch and the second switch are powered down, both the 0 degree phase and the 180 degree phase of the quarter rate clock signal are inactive, resulting in the electronic circuit switching operation from the first mode to the second mode.

17. The method of claim 16, wherein, when the first switch and the second switch are powered down, IQ and DCC circuitry associated with the 0 degree phase and the 180 degree phase of the quarter rate clock signal are also powered down.

18. The method of claim 13, wherein a digital serializer is in communication with the analog serializer, wherein the digital serializer is configured to perform either bit duplication or bit decimation on the data stream to enable the electronic circuit to switch operation from the first mode to the second mode.

19. The method of claim 18, wherein logic is added and controlled by switches to perform either bit duplication where every consecutive bit is same or bit decimation to power down every alternate bit at an output of the digital serializer to transmit a subset of the data from the analog serializer to the multiplexer.

20. A non-transitory computer readable medium comprising stored instructions, which when executed by a processor, cause the processor to:
serialize a data stream in response to a clock signal to output N data in parallel;
couple a pulse generation circuit to the clock signal, wherein a first switch and a second switch electrically communicate with the pulse generation circuit;
feed the N data in parallel to a 4:1 multiplexer that includes four inputs each having a 2:1 multiplexer input; and
select, by the 2:1 multiplexer input, a subset of the N data when switching operation of an transmitter from a quarter-rate mode to a half-rate mode.

\* \* \* \* \*